*E. G. Dyer,*
Circular Saw Mill.

Nº 29,682.    Patented Aug. 21, 1860.

Witnesses.
Wm Clough
John Q. Adams

Inventor.
Elbridge G. Dyer

UNITED STATES PATENT OFFICE.

ELBRIDGE G. DYER, OF HAMILTON, OHIO.

FEED-MOTION FOR SAWMILLS.

Specification of Letters Patent No. 29,682, dated August 21, 1860.

*To all whom it may concern:*

Be it known that I, ELBRIDGE G. DYER, of Hamilton, in the county of Butler and State of Ohio, have invented certain new and useful Improvements in Sawmills; and I do hereby declare that the following is a full, clear, and exact description thereof, reference being had to the accompanying drawings, and to the letters of reference marked thereon, forming a part of this specification.

In saw mills of ordinary construction the log to be sawed is mounted upon a movable log carriage which feeds the log to the saw by a continuous or an intermittent motion until the cut is made; the carriage with the log is then returned to an original position where the latter is adjusted on the carriage for a new cut and is again fed to the saw as before.

My invention relates to saw mills in which the motion of the carriage is continuous, and it consists in the arrangement of mechanism hereinafter described for imparting the forward and back motion to the carriage.

Figure 1:
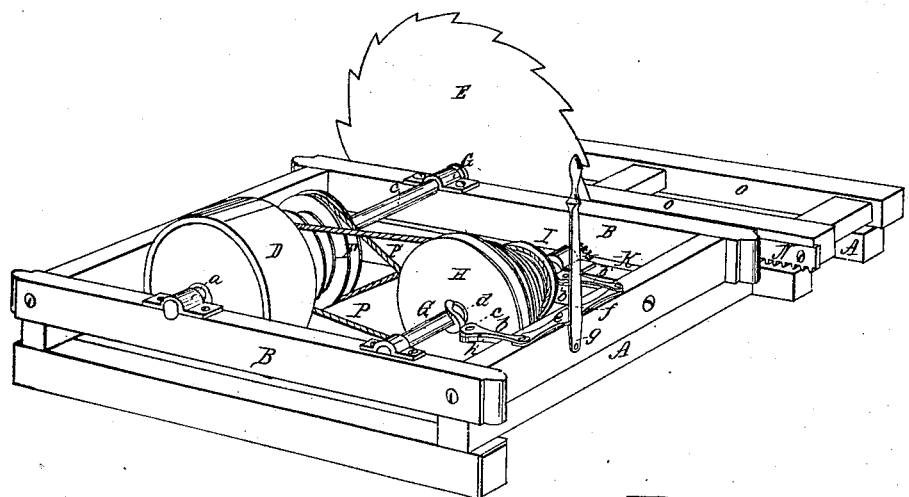
Figure 2:
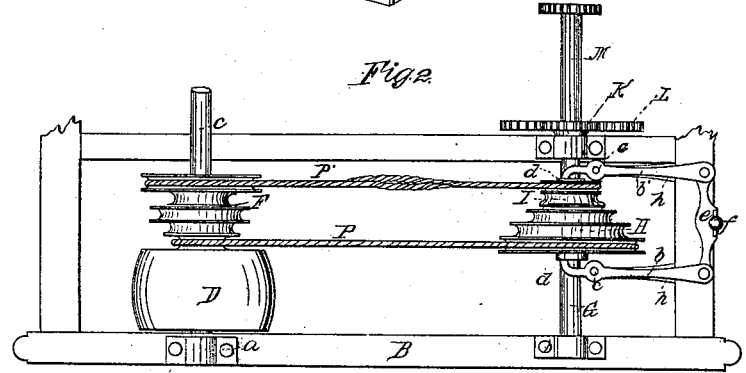
Figure 3:
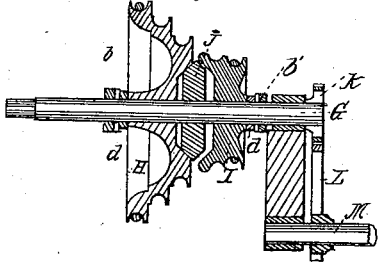

In the annexed drawings Figure 1, represents a perspective view of a saw mill or portion thereof in which my improvement is represented in appropriate combination with the operating parts of the mill. Fig. 2, is a plan representation of my improvements. Fig. 3, is a sectional elevation of parts which will be described.

Like letters of reference indicate corresponding parts in all the drawings.

A, is a rectangular frame or foundation upon which the working parts of the mill are supported.

B, is a heavy frame resting upon A.

C is the saw arbor, having journals by which it is supported in boxes $a$.

D, is a driving pulley which receives the belt by which motion is communicated to the saw and the working parts of the mill.

E is the saw secured in the usual manner to the end of the arbor C.

F, is a series of sheaves or pulleys upon the arbor C.

G, is an auxiliary shaft parallel with the arbor C, and carrying a series of sheaves or pulleys H, and another series I.

The sheaves F, are fixed and immovable upon the arbor $c$, while the sheaves H, I, are not confined but may be allowed to rotate freely on the shaft G.

J is a circular disk fixed and immovable upon the shaft G. It is placed between the sheaves H, I, in an area formed by recesses in the adjacent side faces of the sheaves as shown in Fig. 3. The periphery of the disk J, is chamfered each way from the center forming two inclined or conical faces which are presented, one toward each of the sheaves, and the recesses in the sheaves are made with flaring faces which exactly correspond with the conical or inclined faces of the disk J, so that when either of the sheaves which are loose upon the shaft, is pressed into contact with the disk J, the conical surface of J, enters the respective recess in the sheaves and wedges itself therein causing an adhesion of the surfaces of contact. The purpose of this will be explained hereafter.

$b$, $b'$, are shifting bars pivoted at $c$, to stationary arms $h$, which project from the inner face of frame B, the bars $b$, are forked to embrace the shaft G, as shown, and the ends of the bars which thus inclose the shaft are arranged to act against collars $d$, which surround the shaft, and these collars act respectively against the sheaves H, I. The outer ends of bars $b$, $b'$, are connected by a cross bar or link $e$, and this is recessed or notched to receive the upright hand lever $f$, which is pivoted to the frame B, at $g$. It will now appear that when the hand lever $f$, is acted upon in the appropriate direction, it will cause the sheaves H, to be pressed by the action of the forked end of the bar $b$, against the disk J, when the conical or wedging face of the latter will enter the flaring recess in the sheaves, as represented in Fig. 3; and when the lever $f$, is acted upon in an opposite direction the sheaves H, will be released from contact with J, and the sheaves I, will be forced into contact therewith.

The inner end of shaft G, carries a pinion K, which is in gear with a wheel L, upon a shaft M, and the inner end of shaft M, carries a pinion which is in gear with the rack N, secured to and projecting slightly below the under face of log carriage O. The log carriage slides upon an appropriate carriage way and is so arranged as to support a log or piece of timber in an appropriate manner to be sawed by the saw E, and to feed the log or timber to the saw continuously while the operation of sawing is being performed.

P, P', are round belts which connect the series of sheaves F, upon the arbor C, with the sheaves H, and the sheaves I, respectively upon the shaft G, communicating motion to the latter, but the belt P', is a crossed belt, hence when the sheaves F, are rotated with the arbor C, communicating motion through the belts P, P', to the sheaves H, and I, upon the shaft G, these sheaves will be caused to rotate in opposite directions, moreover it will be observed that the belt P, is applied to a small sheave upon the arbor C, and to a large sheave H, upon the shaft G, hence it communicates a reduced motion to the latter, while the crossed belt P', leads from a large sheave upon the arbor to a smaller sheave I, upon the shaft G, communicating thereby an accelerated motion to the latter.

The operation of the saw mill with my improvements applied is as follows: A log having been placed upon the carriage in a position to be presented to the action of the saw, the saw is put in motion, but the sheaves H, and I, rotate freely upon the shaft G, and the carriage remains stationary. The operator then presses the hand lever $f$, in the appropriate direction to force the sheaves H, into contact with the disk J upon the shaft G, the adhesion of the surfaces of contact which has been mentioned, causes the disk J, to be rotated simultaneously with the sheaves H, but J, being stationary upon its shaft the latter is caused to rotate simultaneously with the sheave and with the saw arbor from which its reduced motion is derived. The pinion K, upon the end of shaft G, imparts a reduced motion to wheel L, upon shaft M, and the pinion upon the end of M, gearing into rack N, upon the log carriage O, as has been explained imparts a reduced motion to the carriage, feeding the log to the saw at a regular and appropriate speed. The cut having been made and it being desired to return the carriage and the log to a position for a new cut, the hand lever $f$, is forced by the operator in an opposite direction allowing the sheaves H, to leave their contact with the disk J, and causing the sheaves I, to be pressed into contact therewith when an adhesion of the surfaces of contact takes place and the disk J, is caused to rotate simultaneously with the sheaves I. But, as has been said the sheaves I, rotate in an opposite direction, and the log carriage O, will be caused to return back toward the position from which it was first moved. Moreover the sheaves I, as has been mentioned, have an accelerated motion, hence the return of the log carriage will be more rapid than its forward or feed motion, thus accomplishing this minor part of the operation without unnecessary loss of time. The sheaves H, and I, are arranged in conical or graduated series with reference to each other permitting the belt P, to be so applied as to feed the log at a comparatively increased or diminished rate according to the size of the log and to the resistance encountered by the saw.

Having thus fully described my invention what I claim as new, and desire to secure by Letters Patent, is—

The arrangement of the sheaves or pulleys F, reversing sheaves or pulleys H and I, disk J, and reversing lever $f$, link $e$, and bars $b$, $b'$, or their equivalents, whereby motion is communicated to the feed gear of a log carriage in either direction substantially in the manner described.

ELBRIDGE G. DYER.

Witnesses:
W<small>M</small>. C<small>LOUGH</small>,
J<small>OHN</small> Q. A<small>DAMS</small>.